(12) United States Patent
Pattabiraman (10) Patent No.: US 6,873,825 B2
(45) Date of Patent: Mar. 29, 2005

(54) SYSTEM AND METHOD FOR OPTIMIZING BLUETOOTH TRANSMISSIONS TO OVERCOME SIGNAL INTERFERENCE

(75) Inventor: Ganesh Pattabiraman, Stanford, CA (US)

(73) Assignee: Qualcomm, Incorporated, San Diego, CA (US)

( * ) Notice: Subject to any disclaimer, the term of this patent is extended or adjusted under 35 U.S.C. 154(b) by 412 days.

(21) Appl. No.: 10/094,014

(22) Filed: Mar. 7, 2002

(65) Prior Publication Data

US 2003/0139136 A1 Jul. 24, 2003

Related U.S. Application Data

(60) Provisional application No. 06/347,373, filed on Jan. 10, 2002.

(51) Int. Cl.[7] .................................................. H04B 7/00
(52) U.S. Cl. ................... 455/41.2; 455/575.5; 455/63.1; 455/67.13; 455/423; 455/556.1; 455/556.2; 375/132; 375/133; 375/219; 370/338; 370/345; 370/348; 370/350
(58) Field of Search ............................. 455/41.2, 575.5, 455/63.1, 67.13, 423, 556.1, 556.2; 375/132, 133, 219; 370/338, 345, 348, 350

(56) References Cited

U.S. PATENT DOCUMENTS

| | | | | |
|---|---|---|---|---|
| 6,108,374 A | * | 8/2000 | Balachandran et al. | 375/227 |
| 6,389,291 B1 | * | 5/2002 | Pande et al. | 455/456.5 |
| 6,594,238 B1 | * | 7/2003 | Wallentin et al. | 370/252 |
| 6,600,726 B1 | * | 7/2003 | Nevo et al. | 370/278 |
| 6,643,278 B1 | * | 11/2003 | Panasik et al. | 370/330 |

OTHER PUBLICATIONS

Shoemake, "Wi–Fi (IEEE 802.11b) and Bluetooth: Coexistence Issues and Solutions for the 2.4 GHz ISM Band," Texas Instruments, White Paper, Feb. 2001, Version 1.1, pp. 1–17.

Liang, "Proposal for Non–Collaborative BT and 802.11b MAC Mechanisms for Enhanced Coexistence ," IEEE 802.15–01/026rl, Mar. 2001, pp. 1–27.

Y.–H. You et al. "Adaptive frequency hopping scheme for interference–limited WPAN applications," Electronics Letters, Jul. 19, 2001, vol. 37, No. 15, pp. 976–978.

Golmie, "Interference Aware Bluetooth Scheduling Techniques," IEEE 802.15–01/00143r0, Working Group for Wireless Personal Area Networks, Mar. 2001, pp. 1–23.

* cited by examiner

*Primary Examiner*—Marceau Milord
(74) *Attorney, Agent, or Firm*—Philip R. Wadsworth; Thien T. Nguyen; S. Hossain Beladi

(57) ABSTRACT

Transmissions of a Bluetooth device are optimized to overcome signal interference. Mapping rules dictate different Bluetooth packet types to be used for transmission under various specified conditions including prescribed signal interference characteristics. The Bluetooth device measures signal interference characteristics upon different Bluetooth frequencies. The Bluetooth device identifies messages pending transmission to one or more remote Bluetooth devices, and receives designation of frequencies to be used in transmitting the pending messages to the remote Bluetooth device according to a predetermined frequency hopping scheme. The Bluetooth device applies the mapping rules to conditions including at least the measured signal interference characteristics for the designated frequencies to select Bluetooth packet types for use in transmitting the identified messages to the remote Bluetooth device.

31 Claims, 4 Drawing Sheets

SYSTEM AND METHOD FOR OPTIMIZING BLUETOOTH TRANSMISSIONS TO OVERCOME SIGNAL INTERFERENCE

CROSS-REFERENCE TO RELATED APPLICATIONS

This application is a Nonprovisional application that claims the benefit under 35 USC 119e of co-pending U.S. Provisional Application No. 60/347,373, filed on Jan. 10, 2002. The entirety of the foregoing provisional application is hereby incorporated herein by reference.

BACKGROUND

1. Field

The present invention concerns Bluetooth communications, and more particularly, a method and system for optimizing Bluetooth transmissions to overcome signal interference.

2. Description of Related Art

"Bluetooth" is a wireless personal area network technology supporting wireless voice and data communication between different nearby devices. A number of different devices can be Bluetooth-enabled, for example, cell phones, personal digital assistants, or laptop computers. Each such device is equipped with a receiver, transmitter, and other Bluetooth components, allowing it to communicate with other similarly equipped devices nearby without the use of cables or other physical connections.

Bluetooth enabled devices ("Bluetooth devices") operate in the unlicensed 2.4 GHz ISM ("Industrial, Scientific and Medical") band, which spans a frequency range of 2400.0 to 2483.5 MHz in the United States and Europe. The ISM band is further divided into 80 RF channels or frequency bins, which are each 1.0 MHz wide.

In addition to Bluetooth devices, the ISM band is also occupied by systems that operate under the IEEE 802.11 b specification for wireless local area networks ("IEEE 802.11b wireless systems"). Other devices such as microwave ovens also operate in the same ISM band. IEEE 802.11b wireless systems and microwave ovens operate in the ISM band at much greater transmit power than Bluetooth devices. Thus, due to the overlapping frequency bands and greater signal strength utilized by some non-Bluetooth devices, there is a possibility of such devices interfering with Bluetooth communications.

Signal interference is undesirable for various reasons. Chiefly, signal interference can cause Bluetooth transmissions to fail, requiring time-consuming retransmission at the expense of additional power consumption. Since many Bluetooth devices operate on battery power, greater power consumption is undesirable because it drains the battery more quickly. Ultimately, the battery must be recharged, or if a recharging source is unavailable, the battery will cease to operate. As another disadvantage of signal interference, retransmission of Bluetooth signals increases the possibility of causing interference for other Bluetooth and/or IEEE 802.11 b wireless systems operating in the same area. As still another disadvantage, signal interference can reduce the quality of real-time, streaming data, causing a garbled or low quality signal. For various reasons, then, signal interference in Bluetooth communications is undesirable.

To avoid interference from other devices operating in the ISM band, the Bluetooth system uses a technique known as "frequency hop spread spectrum." In frequency hop spread spectrum, inter-communicating Bluetooth devices hop to a different frequency after each transmission and reception, at a rate of 1600 hops per second. Thus, transmitting and receiving at a different frequency 1600 times per second reduces the probability of the Bluetooth devices encountering long lasting signal interference in one particular frequency bin.

The following approach has been developed to further reduce potential interference to Bluetooth communications. Here, the Bluetooth devices identify the particular ISM frequency bins where interfering devices are radiating or transmitting. The inter-communicating Bluetooth devices then agree to avoid transmitting and receiving on those particular bin frequencies. However, this approach requires governmental approval from the Federal Communications Commission, which currently does not allow devices operating in the ISM band to coordinate transmissions of two radios by selecting fixed frequency subsets.

Another approach is mentioned in a white paper published by Texas Instruments, entitled "Wi-Fi (IEEE 802.11b) and Bluetooth," by Matthew B. Shoemaker, February 2001, Version 1.1. The Shoemaker paper recognizes that various mechanisms can be used to improve the coexistence level of Bluetooth devices when interference is present. For data connections, Shoemaker proposes that Bluetooth devices adaptively select the type of error control used and the length of each packet to transmit in order to maximize the throughput. In addition, Shoemaker proposes flow control to dynamically increase and decrease the rate of transmission. For example, when a contiguous block of bad channels is reached, the Bluetooth device places traffic on hold until good channels are available. Nonetheless, the Shoemaker paper lacks practical details of how to implement these concepts.

Consequently, known Bluetooth communication systems are not completely adequate in all respects due to the unsolved problem of signal interference.

SUMMARY

Broadly, the present invention concerns a Bluetooth device configured to optimize transmissions to overcome signal interference. Mapping rules dictate different Bluetooth packet types to be used for transmission under various specified conditions including prescribed signal interference characteristics. The Bluetooth device measures signal interference characteristics upon different Bluetooth frequencies. The Bluetooth device identifies messages pending transmission to one or more remote Bluetooth devices, and receives designation of frequencies to be used in transmitting the pending messages to the remote Bluetooth device according to a predetermined frequency hopping scheme. The Bluetooth device applies the mapping rules to conditions including at least the measured signal interference characteristics for the designated frequencies to select Bluetooth packet types for use in transmitting the identified messages to the remote Bluetooth device.

The invention affords its users with a number of distinct advantages. Chiefly, the invention conducts Bluetooth transmissions even in the presence of signal interference. Consequently, transmissions are more likely to succeed, avoiding power consumptive retransmission attempts and ultimately conserving battery power. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

The present invention is generally directed to the transmission of Bluetooth signals in the presence of interference. And, although the invention is described with respect to specific embodiments, the principles of the invention as defined by the claims appended herein may be applied beyond the embodiments of the description described specifically herein. Moreover, certain details have been omitted to avoid obscuring the inventive aspects of the invention. The specific details not described in the present application are within the knowledge of a person of ordinary skill in the art, having the benefit of this disclosure.

The drawings in the present application and their accompanying detailed description are directed to examples of different embodiments of the invention. To maintain brevity, other embodiments of the invention that use the principles of the present invention are not specifically described in the present application and are not specifically illustrated by the present drawings.

Figure 1:
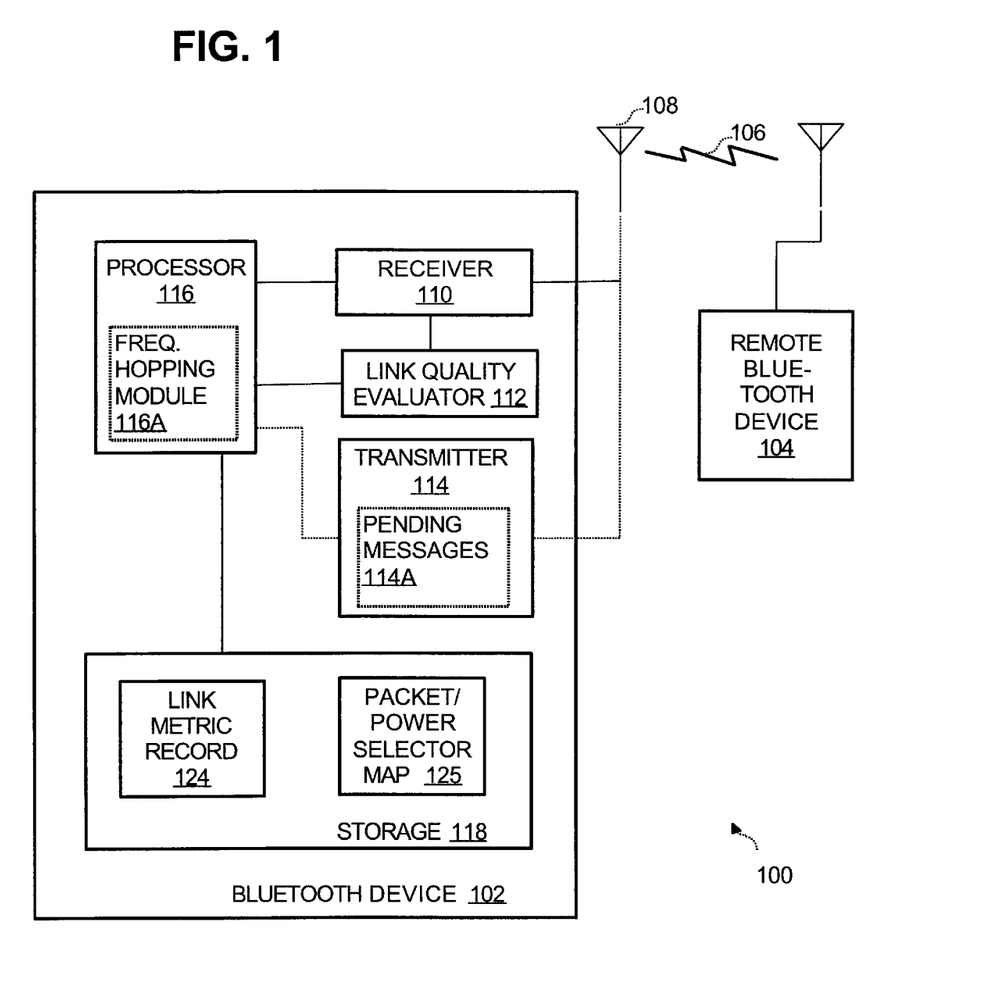
FIG. 1 is a block diagram of an exemplary Bluetooth system in accordance with one embodiment of the invention.

FIG. 1 illustrates an exemplary Bluetooth system 100 according to one embodiment of the invention. As one example, the system 100 may comprise part of a code division multiple access ("CDMA") communication system configured to be interoperable with Bluetooth technology. The general principles of CDMA communication systems, and in particular the general principles for generation of spread spectrum signals for transmission over a communication channel are described in various well known patents and publications.

The system 100 includes first and second Bluetooth devices 102, 104. Some examples of the Bluetooth devices 102, 104 include, for example, Bluetooth-enabled CDMA cell phones, cordless phone base stations, laptop computers, etc. For purposes of illustration, the device 102 is in active communications with the device 104, referred to as the "remote device." Active mode communications involve the exchange of messages related to customer or subscriber data, in contrast with metadata and network data exchanged during idle or standby mode communications and not necessarily associated with customer/subscriber data. In an implementation, each of the devices 102, 104 may be in communication with one or more additional devices (not shown), as permitted by the Bluetooth protocol.

In the illustrated example, the system 100 utilizes the Bluetooth wireless networking protocol, as described in Bluetooth Specification v1.1, published by the Bluetooth Special Interest Group. Here, Bluetooth device 102 is configured to communicate with remote device 104 in the 2.4 GHz ISM band utilizing frequency hop spread spectrum ("FHSS") technology. Bluetooth device 102 communicates with remote device 104 via Bluetooth wireless link 106 utilizing antenna 108.

Utilizing FHSS technology, Bluetooth devices 102, 104 receive and transmit at 80 different 1.0 MHz-wide frequency channels, also referred to as "frequency bins" in the present application. The duration of each Bluetooth transmission is referred to as a "slot interval" in the present application, and comprises one, three, or five 625.0 microsecond time "slots." Thus, Bluetooth devices 102, 104 communicate by transmitting and receiving voice, data, or voice and data packets at a frequency bin during a duration of time equal to a slot interval, and then transmitting and receiving at another frequency bin during a next slot interval, and so on.

When communicating in an asynchronous connection link ("ACL") data connection, the devices 102, 104 utilize "DM" and "DH" packets. A "DM" packet refers to a medium data rate packet, and a "DH" packet refers to a high data rate packet. DM and DH packets have a suffix that refers to the number of time "slots" the particular packet spans. In other words, DM and DH packets have a suffix that refers to the number of time "slots" required to transmit the packet. For example, a DM1 packet is transmitted in one time slot, and a DH3 packet is transmitted in three time slots.

The packet data rate and the number of time slots the packet spans determine the amount of information the packet carries, that is, the packet's data payload. For example, a DM1 packet, which spans one time slot, carries 18 bytes of information, while a DM3 packet, which spans three time slots, carries 123 bytes of information. Further, the longer a packet remains at a particular frequency bin (the more time slots a packet spans), the more susceptible the packet is to interference from another signal at that frequency bin. Thus, a DM3 packet, which spans three time slots, is more susceptible to interference than a DM1 packet, which only spans one time slot.

DM packets have forward error correction ("FEC"), which is an error protection scheme designed to reduce the number of re-transmissions required to successfully communicate a packet's data payload between transmitting and receiving Bluetooth devices. FEC error protection is useful to communicate a packet's data payload from a transmitting Bluetooth device to a receiving Bluetooth device in an environment where an undesirable level of interference exists. However, in an environment containing a minimal level of interference, the FEC error protection scheme adds unnecessary overhead that reduces data throughput.

DM packets utilize a "⅔ rate" FEC protection scheme, which encodes each block of 10 information bits into a 15 bit codeword. This code can correct all single errors and detect all double errors in each codeword. In contrast to DM packets, which utilize ⅔ rate FEC error protection, DH packets provide no FEC error protection. Thus, for example, DH packets are appropriate for use in a relatively error-free environment where high data throughput is desired, whereas DM packets are more appropriate to reduce the number of retransmissions in an error-producing environment, that is, an environment containing a high level of interference.

Continuing with FIG. 1, Bluetooth device 102 includes a processor 116, receiver 110, link quality evaluator 112, transmitter 114, storage 118, and antenna 108. The storage 118 includes a link metric record 124 and a packet/power selector map 125.

The receiver 110 comprises, as an example, a Bluetooth-compatible demodulator. Likewise, the transmitter 114 may comprise a transmitter, compatible with the Bluetooth protocol. Receiver 110 is configured to receive Bluetooth voice and/or data packets from remote device 104 over Bluetooth wireless link 106 via antenna 108. Unintentionally, receiver 110 may also receive signal interference including signals from microwave ovens and IEEE 802.11b wireless systems, for example.

The transmitter 114 is configured to transmit Bluetooth messages in the form of voice and/or data packets to devices such as the remote device 104, using the antenna 108 and wireless link 106. The transmitter 114 is illustrated with messages 114a pending transmission to the remote device 104. The pending messages 114a may be implemented in a buffer, register, or other storage. Alternatively, the messages 114a may be located in storage of the processor 116 or another location, the illustrated location 114a being shown as one example.

Link quality evaluator 112 comprises circuitry to evaluate the quality of signals received by 110. In the illustrated example, the evaluator 112 measures quality of signals arriving in any of the 80 frequency bins in the 2.4 GHz ISM band. Signal quality may be gauged by measured energy (total strength of received signals), the number of packets of a received message in error ("packet error rate"), the signal-to-noise ratio, number of messages whose receipt is failed requiring retransmission by the remote device 104, or another appropriate criteria. One particular gauge of measured energy is received signal strength indicator (RSSI). Depending upon the nature of the signal evaluation being implemented, the evaluator 112 may be coupled to the receiver 110, processor 116, or both. In the illustrated example, the invention 112 keeps track of signal strength of received signals (whether noise or not), keeps track of signal strength of bona fide Bluetooth signals, and also identifies and tracks signal interference levels.

In the illustrated example, the storage 118 comprises circuit memory such as random access memory (RAM). However, the storage 118 may be implemented by a hard disk drive, flash memory, or any other volatile or nonvolatile storage. The storage 118 is coupled to processor 116, enabling the processor 116 to read/write information from/to information to the storage 118. The storage 118 includes a link metric record 124 and a packet/power selector map 125. The record 124 is used to store information produced by the evaluator 112, and namely, information evaluating the signal quality in the various Bluetooth communication frequencies.

In one specific implementation, the record 124 comprises a table as shown below in TABLE 1. The illustrated table includes 80 rows, with each row corresponding to one of the 80 frequency bins in the 2.4 GHz ISM band. For each frequency bin, the record 124 lists the evaluator 112's overall rating of average signal strength for this bin (for both data and noise), the average signal strength of data-only signals in this frequency bin, and the average signal interference (namely the difference between overall and data signal strength). Optionally, signal interference (column 5) may be omitted to conserve storage, since this information may be obtained by taking the difference of columns 2 and 3. The particular example of TABLE 1 utilizes RSSI to measure signal quality. In the example of TABLE 1, then, frequency bin 2 shows a significant amount of noise since the overall average RSSI is 25 but the average of received data signals is 5. In contrast, frequency bin 1 shows no noise as the overall average and data-only average signal strengths are the same.

TABLE 1

EXEMPLARY LINK METRIC RECORD 124

| col. 1 ROW | col. 2 FREQ. | col. 3 OVERALL AVERAGE SIGNAL STRENGTH (dBm) | col. 4 AVERAGE SIGNAL STRENGTH OF RECEIVED DATA SIGNALS (dBm) | col. 5 SIGNAL INTERFERENCE ("LINK METRIC") (dBm) |
|---|---|---|---|---|
| 1 | bin 1 | RSSI = 1 | RSSI = 1 | RSSI = 0 |
| 2 | bin 2 | RSSI = 25 | RSSI = 5 | RSSI = 20 |
| 3 | bin 3 | RSSI = 3 | RSSI = 1 | RSSI = 2 |
| ... | ... | ... | ... | ... |
| 80 | bin 80 | RSSI = 2 | RSSI = 2 | RSSI = 0 |

The storage 118 further includes a packet/power selector map 125. The map 125 contains instructions, data, logic, artificial intelligence, or other data or decision making capability to determine which packet type is appropriate to transmit pending messages 114a. This decision is based upon the size of the message 114a, frequency bin to be used (according to the Bluetooth frequency hopping scheme), signal interference in that frequency bin (according to the record 124), characteristics inherent to each different packet type (e.g., number of slots, robustness of error correction, etc.), and the like. The map 125 also contains data or decision making capability to determine which power level is appropriate to transmit pending messages 114a, based on the foregoing considerations and, in addition, the type of packet to be used. The map 125, also referred to as "mapping rules," may be implemented by a lookup table, relational or non-relational database, logic circuitry, instruction processing machine, artificial intelligence, or other appropriate decision maker. TABLE 2, below, gives one example of some exemplary entries in a packet/power selector map 125, implemented as a lookup table.

TABLE 2

EXEMPLARY MAP 125

| ROW | LINK METRIC VALUE | FREQ. BIN | PENDING DATA LENGTH (Bytes) | PACKET TYPE TO BE USED BASED ON COLUMNS TO LEFT | TRANSM. POWER LEVEL, BASED ON COLUMNS TO LEFT (dBm) |
|---|---|---|---|---|---|
| 1 | 5 | 2 | 21 | DH1 | −10 |
| 2 | 11 | 4 | 10 | DM1 | 0 |
| 3 | 5 | 4 | 25 | DH1 | −12 |
| 4 | 17 | 6 | 125 | DM3 | −5 |
| 5 | 15 | 6 | 23 | DM1 | 0 |
| 6 | 3 | 8 | 127 | DH3 | −20 |
| 7 | 14 | 8 | 112 | DM3 | −5 |
| 8 | 10 | 10 | 12 | DM1 | −2 |
| ... | ... | ... | ... | ... | ... |

TABLE 2 is configured to determine the optimal packet type and transmit power level for each particular circumstance. The "optimal" packet type and transmit power is that which is most likely to maintain data throughput while producing a minimal level of packet re-transmissions at a particular frequency bin, and takes into account, for example, the advantages and properties of packet types as discussed above.

Some exemplary considerations are discussed in greater detail as follows. One consideration includes the limitations of the equipment. For instance, one known model of transmitter 114 is capable of operating at a range of −60.0 dBm to 0 dBm, that is, one microwatt to approximately one milliwatt. In this embodiment, the typical power level for transmitting packets may be between −35.0 dBm to −40.0 dBm. Other considerations include the competing concerns of more robust error correction (versus slower communication), shorter data packets (versus slower communication), longer data packets (versus greater exposure to signal interference), more transmit power (versus shorter battery length), and the like. As an example, one consideration of competing concerns recognizes that if signal interference is significantly high (indicating poorer channel conditions), then TABLE 2 should specify a more reliable (less error prone) packet type. For example, a DM1 packet, which has ⅔ rate FEC protection and spans only one time slot, is more reliable than a DH3 packet, which has no FEC protection and spans three time slots. In a different example, TABLE 2 may specify an upper limit on packet size for each set of conditions, leaving the processor 116 free to choose that or any smaller packet size depending upon the circumstances.

The processor 116 comprises a digital signal processing apparatus that oversees operations of the device 102. The processor 116 may be implemented by various hardware devices and components, as discussed in greater detail below. One component of the processor is the frequency hopping module 116a. The module 116 comprises a software program, subroutine, data object, hardware device or subcomponent, circuit, or other module that selects frequency bins to be used to transmit pending data 114a, for example using FHSS technology.

As mentioned above, data processing entities such as the device 102, device 104, processor 116, map 125, and the like may be implemented in various forms. One example is a digital data processing apparatus, as exemplified by the hardware components and interconnections of the digital data processing apparatus 200 of FIG. 2.

Figure 2:
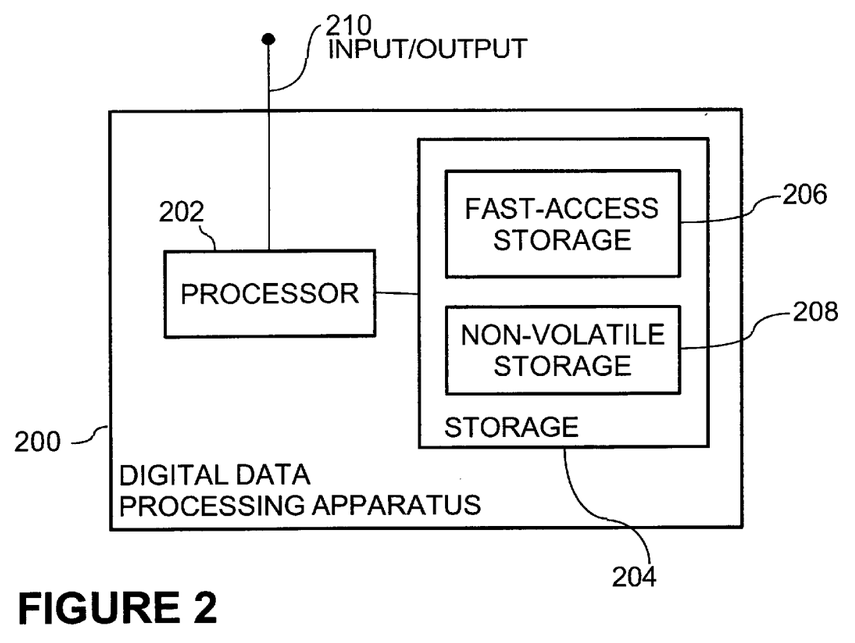
FIG. 2 is a block diagram of an exemplary digital data processing machine.

The apparatus 200 includes a processor 202, such as a microprocessor, personal computer, workstation, controller, microcontroller, state machine, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

In contrast to the digital data processing apparatus discussed above, a different embodiment of the invention uses logic circuitry instead of computer-executed instructions to implement processing entities of the system 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Having described the structural features of the present invention, the operational aspect of the present invention will now be described. As mentioned above, the operational aspect of the invention generally involves operating a Bluetooth device to transmit data to best overcome detected signal interference.

Figure 3:
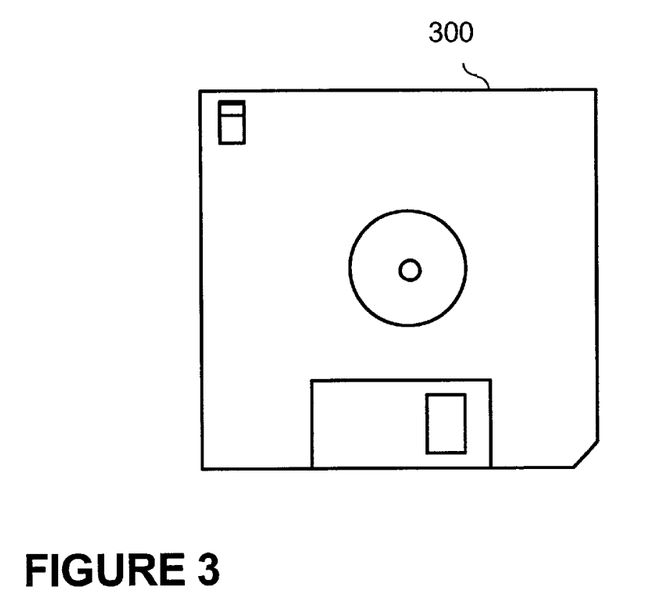
FIG. 3 is a diagram of an exemplary signal bearing medium.

Wherever the functionality of the invention is implemented using one or more machine-executed program sequences, these sequences may be embodied in various forms of signal-bearing media. In the context of FIG. 2, for example, such a signal-bearing media may comprise, for example, the storage 204 or another signal-bearing media, such as a magnetic data storage diskette 300 (FIG. 3), directly or indirectly accessible by a processor 202. Whether contained in the storage 204, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Figure 4:
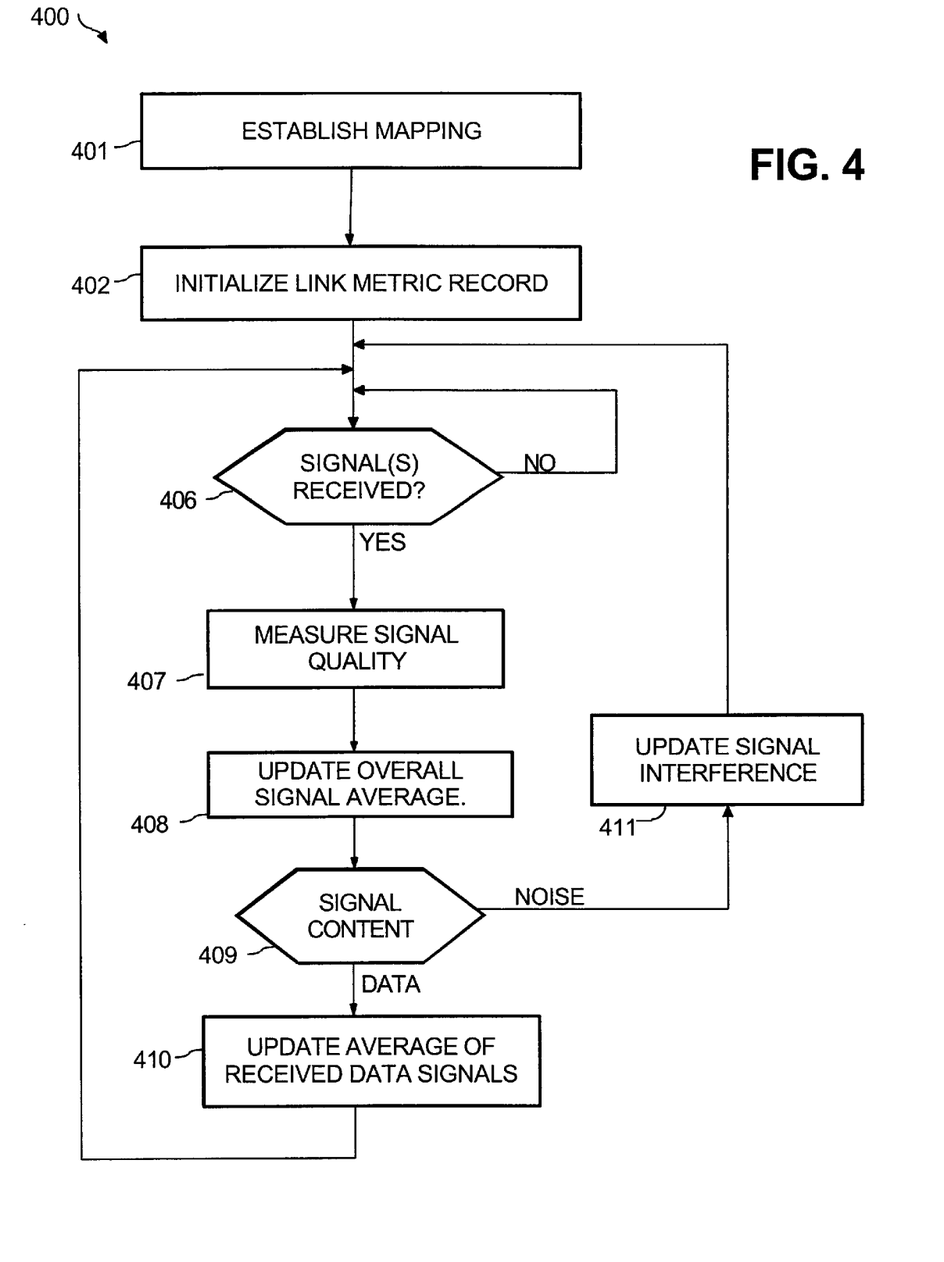
FIG. 4 is a flowchart of a process for evaluating received Bluetooth signals.

Referring FIG. 4, the sequence 400 describes an exemplary process for evaluating received Bluetooth signals to measure signal interference. As described below in FIG. 5, this information is used to optimize Bluetooth transmissions to succeed in spite of signal interference. For illustrative purposes, without any intended limitation, the sequence 400 is described in the context of the Bluetooth device 102 in its communication with the remote device 104 (FIG. 1).

In step 401, the map 125 is established. This step may be performed in different ways, depending upon the structure of the map 125. For instance, step 401 may involve programmers, engineers, technicians, or other designers constructing a lookup table, configuring logic circuitry, training an artificial intelligence unit, or otherwise configuring the map 125. In this step, the map 125 is configured to choose the packet type and power level appropriate to transmit messages 114a and maintain data throughput while producing a minimal level of packet re-transmissions for each particular frequency bin. The map 125 provides mapping rules correlating different packet types to be used for transmission with various conditions including, at minimum, measured signal interference characteristics. A few examples follow.

In one example, if the most recent update of frequency bin 4 indicated a link metric value of 5, and the amount of data to be transmitted is 25 bytes, then a DH1 packet is chosen with transmit power level of −12 dBm (as shown by row 3 of TABLE 2, above). In another example, if the most recent update of frequency bin 6 indicated a link metric of 15, and the amount of data to be transmitted is 23 bytes, then a DM1 is selected with transmit power of 0 dBm (as shown by row 5 of TABLE 2, above). The remainder 6 bytes is transmitted in the next slot. In still another example, if the most recent update of frequency bin 8 indicated a link metric of 14, and 112 bytes of data are to be transmitted, then a DM3 packet is selected and the transmit power level is set to −5 dBm (as shown by row 7 of TABLE 2, above).

In step 402, the processor 116 initializes the link metric record 124. For instance, the processor 116 may open a blank table, clear a previously established table, create a data structure, or otherwise initialize a data object appropriate to the record 124.

In step 406, the processor 116 and/or receiver 110 determines whether the device 102 has received any signals from other Bluetooth devices. This may be achieved, for example, by checking a receive buffer (not shown), polling the receiver 110, checking a record of past signals that have already been received but not evaluated for signal interference, or another technique. If there are any received signals that have not been evaluated (as discussed below), the process 400 advances from step 406 to step 407, where the link quality evaluator 112 selects the next received signal (by time of receipt, priority, frequency bin, or any other selection criteria) and then measures the received signal's quality. As mentioned above, the evaluator 112 may gauge signal quality based on measured energy (total strength of received signals, such as RSSI), the number of packets of a received message in error ("packet error rate"), the signal-to-noise ratio, number of messages whose receipt is failed requiring retransmission by the remote device 104, or another appropriate criteria. The evaluator 112 operates using information from the receiver 110 or the processor 116, depending upon the nature of the signal evaluation. For instance, signal-to-noise ratio may be determined based on information from the receiver 110, whereas packet error information is available from the processor 116.

After step 407, the processor 116 in step 408 updates the record 124's overall average signal strength (column 3, TABLE 1). Then, based on the measurement of step 407, step 409 then determines whether the current received signal represents data from another Bluetooth device or signal interference. Broadly, step 409 compares measured signal quality of the received signal against a longstanding average for that characteristic. If the current signal exhibits a sudden deviation from the norm, a conclusion of signal interference is made, and step 409 advances to step 411 to update the signal interference shown in the record 124, namely, the difference between the average overall signal strength (updated in step 408) and the standing average data signal strength. Otherwise, if step 409 finds that the evaluated signal represents data, step 409 advances to step 410, where the processor 116 updates the data-only signal strength. For instance, if the record 124 maintains a running average of RSSI for data signals (as in column 4, TABLE 1), the processor 116 updates the average shown in the record 124 to include the current signal strength. After step 410, step 411 is performed to update the signal interference shown in the record 124, namely, the difference between the average overall signal strength (updated in step 408) and the average data signal strength (updated in step 410). After step 411, the routine 400 returns to step 406 to check for other received signals to process.

As a more particular example of step 409, the link evaluator 112 may compare the received signal's RSSI to the long term average for received data signals (e.g., from column 3, TABLE 1). This average may be constituted of received signals from a recent time window, for received signals of the same frequency bin, or another group of received signals. If the current RSSI exceeds the norm by 5 dBm, 10 dBm, or another prescribed amount, then the link evaluator 112 in step 409 concludes that the current signal is interference rather than Bluetooth data. In another example, the link evaluator 112 may maintain a longstanding average packet error rate (such as CRC failure). If the current signal's CRC failure exceeds the norm by a prescribed margin, the link evaluator 112 in step 409 concludes that the current signal is interference rather than Bluetooth data.

Figure 5:
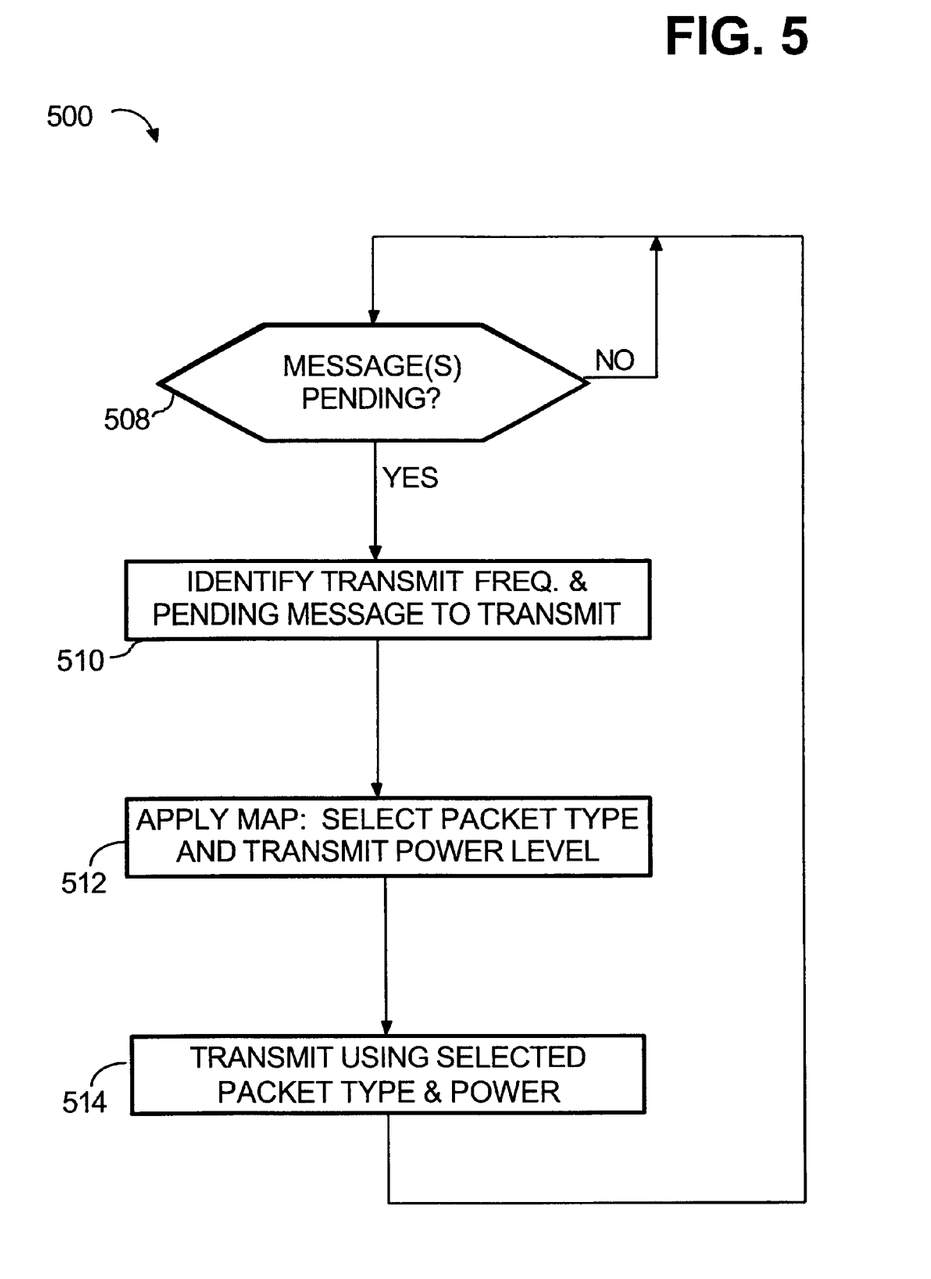
FIG. 5 is a flowchart of a process for optimizing Bluetooth transmissions to overcome detected signal interference.

Referring FIG. 5, the sequence 500 describes an exemplary process for optimizing Bluetooth transmissions to overcome signal interference, utilizing the link metric record 124 prepared in the sequence 400. For illustrative purposes, without any intended limitation, the sequence 500 is described in the context of the Bluetooth device 102 in its communication with the remote device 104 (FIG. 1).

In step 508, the processor 116 and/or transmitter 114 determines whether there are any messages pending transmission to remote devices such as 104. In the illustrated embodiment, this is achieved by checking the pending messages 114a. If there are any pending transmit messages, step 510 is performed, where the processor 116 identifies the next message 114a to be transmitted to the remote device 104. This is referred to as the "next pending message." Also in step 510, the processor 116 receives information from the frequency hopping module 116a designating the next frequency bin to be used in transmitting the next pending message 114a to the remote device 104.

In step 512, the processor 116 chooses the packet type and power level to be used in transmitting the next pending message 114a that was identified in step 510. More particularly, the processor 116 applies the map 125 to the historical signal interference associated with the frequency bin that was selected in step 510. The historical signal interference is obtained from the record 124, as prepared earlier in step 407. For instance, signal interference in the illustrated TABLE 1 is the difference between the average overall signal strength and the average data-only signal strength.

Step 512 determines which packet type(s) to use in transmitting the next pending message to the remote Bluetooth device 104. Depending upon contents of the map 125, the processor 116 may also apply the map 125 to any other applicable properties of the next pending message, assessed signal interference, or other conditions; one example of an additional condition is the size of the message to be sent. As another component of step 512, the processor 116 selects the transmit power level by applying the map 125 to the assessed signal interference characteristics, designated frequency of the module 116a, selected data packet type, and any other relevant properties specified in the map 125.

In a different embodiment of step 512, the map 125 may specify that the processor 116 utilizes a conventional Bluetooth packet/power selection routine as long as the signal interference indicated by the record 124 exceeds does not exceed a predetermined threshold, otherwise utilizing the conventional Bluetooth packet/power selection routine within certain limits if signal interference does exceed the threshold. For instance, the map 125 may dictate that if signal interference exceeds a threshold of −25.0 dBm for frequency bin 30, then future transmissions using that frequency bin 30 must be limited to DM1, DM3, or DH1 packet types. In this example, different thresholds may be used for different frequency bins, or one universal threshold may be applied to all frequency bins. Moreover, different upper limits on packet types may be set for different frequency bins, or one universal data packet limit set.

Next after step 512, the processor 116 in step 514 directs the transmitter 114 to transmit the next pending message 114a using the data packet type and transmit power level chosen in step 512. Following step 514, the program 500 returns to step 508 to process another message pending transmission.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To illustrate one exemplary embodiment, various functional aspects of the invention have been described in terms of illustrative components, blocks, modules, circuit, and steps. Whether such functionality is implemented as hardware, software, or both depends upon the particular application and design constraints imposed on the overall system. Skilled artisans may implement the described functionality in varying ways for each particular application without such implementation decisions departing from the scope of the present invention.

What is claimed is:

1. A method for optimizing Bluetooth transmissions in the presence of signal interference, comprising:
   establishing mapping rules dictating different Bluetooth packet types to be used for transmission under various specified conditions including prescribed signal interference characteristics;
   measuring signal interference characteristics upon different Bluetooth frequencies;
   identifying messages pending transmission to at least one remote Bluetooth device;
   receiving designation of frequencies to be used in transmitting the pending messages to the remote Bluetooth device according to a predetermined frequency hopping scheme;
   applying the mapping rules to conditions including at least the measured signal interference characteristics for the designated frequencies to select Bluetooth packet types for use in transmitting the identified messages to the remote Bluetooth device.

2. The method of claim 1 further comprising:
   transmitting the identified messages to the remote Bluetooth device utilizing the selected packet types.

3. The method of claim 1 wherein the specified conditions further includes a size of message to be transmitted.

4. The method of claim 1 wherein the mapping rules further includes dictating transmit power levels to be used for transmission;
   the applying further comprises applying the mapping rules to conditions including the transmit power levels for use in transmitting the identified messages to the remote Bluetooth device.

5. The method of claim 1, wherein the measuring signal interference characteristics comprises quantifying at least one of the following:
   analog strength of received signals;
   signal to noise ratio of received signals;
   errors occurring in signal receipt;
   failed receive operations requiring retransmission.

6. The method of claim 1, where:
   the establishing operation comprises establishing mapping rules dictating predetermined Bluetooth packet types to be used for transmission when signal interference characteristics exceed a prescribed threshold;
   the measuring operation comprises determining whether signal interference characteristics exceed the prescribed threshold.

7. The method of claim 1, where the measuring operation comprises the following operations for newly received signals:
   updating a record of all-signal average signal strength to include signal strengths of the newly received signals;
   updating a record of Bluetooth-signal-only average signal strength by performing operations comprising:
      determining if signal strength of a newly received signal is within a prescribed margin of the Bluetooth-signal-only average signal strength;
      only if so, concluding that the newly received signal is a Bluetooth signal and updating Bluetooth-signal-only average signal strength to include the newly received signal.

8. A method of operating a Bluetooth device to optimize Bluetooth transmissions in the presence of signal interference by applying mapping rules dictating different Bluetooth packet types to be used for transmission under various specified conditions including prescribed signal interference characteristics, the operations comprising:
   whenever the Bluetooth device receives prescribed types of signals from other Bluetooth devices in corresponding frequency bins, assessing signal interference characteristics of the received signals and storing the assessed signal interference characteristics in a record in association with the corresponding frequency bin;
   performing the following operations for each subject message pending transmission from the Bluetooth device to at least one remote Bluetooth device:
      receiving designation of a frequency bin to be used in transmitting the subject message to the remote Bluetooth device according to a predetermined frequency hopping scheme;
      applying the mapping rules to conditions including at least the assessed signal interference characteristics for the designated frequency bin to determine a Bluetooth packet type for use in transmitting the subject message to the remote Bluetooth device.

9. The method of claim 8, the operations further comprising:
   applying the mapping rules to conditions including at least the assessed signal interference characteristics of the designated frequency bin to determine a transmit power level for use in transmitting the subject message to the remote Bluetooth device.

10. A signal-bearing medium tangibly embodying a program of machine-readable instructions executable by a digital processing apparatus to perform operations for optimizing Bluetooth transmissions in the presence of signal interference, comprising:
    establishing mapping rules dictating different Bluetooth packet types to be used for transmission under various specified conditions including prescribed signal interference characteristics;
    measuring signal interference characteristics upon different Bluetooth frequencies;
    identifying messages pending transmission to at least one remote Bluetooth device;
    receiving designation of frequencies to be used in transmitting the pending messages to the remote Bluetooth device according to a predetermined frequency hopping scheme;
    applying the mapping rules to conditions including at least the measured signal interference characteristics for the designated frequencies to select Bluetooth packet types for use in transmitting the identified messages to the remote Bluetooth device.

11. The medium of claim 10, the operations further comprising:
    transmitting the identified messages to the remote Bluetooth device utilizing the selected packet types.

12. The medium of claim 10, the establishing operations being performed such that the specified conditions further include a size of message to be transmitted.

13. The medium of claim 10,
the mapping rules further dictating transmit power levels to be used for transmission under various specified conditions including prescribed signal interference characteristics;
the applying operation further comprises applying the mapping rules to conditions including the measured signal interference characteristics to select transmit power levels for use in transmitting the identified messages to the remote Bluetooth device.

14. The medium of claim 10, where the operation of measuring signal interference characteristics comprises quantifying at least one of the following:
analog strength of received signals;
signal to noise ratio of received signals;
errors occurring in signal receipt;
failed receive operations requiring retransmission.

15. The medium of claim 10, where:
the establishing operation comprises establishing mapping rules dictating predetermined Bluetooth packet types to be used for transmission when signal interference characteristics exceed a prescribed threshold;
the measuring operation comprises determining whether signal interference characteristics exceed the prescribed threshold.

16. The medium of claim 15, where the measuring operation comprises the following operations for newly received signals:
updating a record of all-signal average signal strength to include signal strengths of the newly received signals;
updating a record of Bluetooth-signal-only average signal strength by performing operations comprising:
determining if signal strength of a newly received signal is within a prescribed margin of the Bluetooth-signal-only average signal strength;
only if so, concluding that the newly received signal is a Bluetooth signal and updating Bluetooth-signal-only average signal strength to include the newly received signal.

17. A signal-bearing medium tangibly embodying a program of machine-readable instructions executable by a digital processing apparatus to perform operations for operating a Bluetooth device to optimize Bluetooth transmissions in the presence of signal interference by applying mapping rules dictating different Bluetooth packet types to be used for transmission under various specified conditions including prescribed signal interference characteristics, the operations comprising:
whenever the Bluetooth device receives prescribed types of signals from other Bluetooth devices in corresponding frequency bins, assessing signal interference characteristics of the received signals and storing the assessed signal interference characteristics in a record in association with the corresponding frequency bin;
performing the following operations for each subject message pending transmission from the Bluetooth device to at least one remote Bluetooth device:
receiving designation of a frequency bin to be used in transmitting the subject message to the remote Bluetooth device according to a predetermined frequency hopping scheme;
applying the mapping rules to conditions including at least the assessed signal interference characteristics for the designated frequency bin to determine a Bluetooth packet type for use in transmitting the subject message to the remote Bluetooth device.

18. The medium of claim 17, the operations further comprising:
applying the mapping rules to conditions including at least the assessed signal interference characteristics of the designated frequency bin to determine a transmit power level for use in transmitting the subject message to the remote Bluetooth device.

19. Logic circuitry of multiple interconnected electrically conductive elements configured to perform operations to optimize Bluetooth transmissions in the presence of signal interference, the operations comprising:
establishing mapping rules dictating different Bluetooth packet types to be used for transmission under various specified conditions including prescribed signal interference characteristics;
measuring signal interference characteristics upon different Bluetooth frequencies;
identifying messages pending transmission to at least one remote Bluetooth device;
receiving designation of frequencies to be used in transmitting the pending messages to the remote Bluetooth device according to a predetermined frequency hopping scheme;
applying the mapping rules to conditions including at least the measured signal interference characteristics for the designated frequencies to select Bluetooth packet types for use in transmitting the identified messages to the remote Bluetooth device.

20. The circuitry of claim 19, the operations further comprising:
transmitting the identified messages to the remote Bluetooth device utilizing the selected packet types.

21. The circuitry of claim 19, the establishing operations being performed such that the specified conditions further include a size of message to be transmitted.

22. The circuitry of claim 19,
the mapping rules further dictating transmit power levels to be used for transmission under various specified conditions including prescribed signal interference characteristics;
the applying operation further comprises applying the mapping rules to conditions including the measured signal interference characteristics to select transmit power levels for use in transmitting the identified messages to the remote Bluetooth device.

23. The circuitry of claim 19, where the operation of measuring signal interference characteristics comprises quantifying at least one of the following:
analog strength of received signals;
signal to noise ratio of received signals;
errors occurring in signal receipt;
failed receive operations requiring retransmission.

24. The circuitry of claim 19, where:
the establishing operation comprises establishing mapping rules dictating predetermined Bluetooth packet types to be used for transmission when signal interference characteristics exceed a prescribed threshold;
the measuring operation comprises determining whether signal interference characteristics exceed the prescribed threshold.

25. The circuitry of claim 19, where the measuring operation comprises the following operations for newly received signals:

updating a record of all-signal average signal strength to include signal strengths of the newly received signals;

updating a record of Bluetooth-signal-only average signal strength by performing operations comprising:

determining if signal strength of a newly received signal is within a prescribed margin of the Bluetooth-signal-only average signal strength;

only if so, concluding that the newly received signal is a Bluetooth signal and updating Bluetooth-signal-only average signal strength to include the newly received signal.

26. Logic circuitry of multiple interconnected electrically conductive elements configured to perform operations to operate a Bluetooth device to optimize Bluetooth transmissions in the presence of signal interference by applying mapping rules dictating different Bluetooth packet types to be used for transmission under various specified conditions including prescribed signal interference characteristics, the operations comprising:

whenever the Bluetooth device receives prescribed types of signals from other Bluetooth devices in corresponding frequency bins, assessing signal interference characteristics of the received signals and storing the assessed signal interference characteristics in a record in association with the corresponding frequency bin;

performing the following operations for each subject message pending transmission from the Bluetooth device to at least one remote Bluetooth device:

receiving designation of a frequency bin to be used in transmitting the subject message to the remote Bluetooth device according to a predetermined frequency hopping scheme;

applying the mapping rules to conditions including at least the assessed signal interference characteristics for the designated frequency bin to determine a Bluetooth packet type for use in transmitting the subject message to the remote Bluetooth device.

27. The circuitry of claim 26, the operations further comprising:

applying the mapping rules to conditions including at least the assessed signal interference characteristics of the designated frequency bin to determine a transmit power level for use in transmitting the subject message to the remote Bluetooth device.

28. A Bluetooth device, comprising:

a transmitter;

a receiver;

a link metric record;

a packet/power selector map providing mapping rules dictating different Bluetooth packet types to be used for transmission under various specified conditions including prescribed signal interference characteristics;

a link evaluator configured to measure signal interference characteristics upon different Bluetooth frequencies;

a processor configured to perform operations to optimize Bluetooth transmissions in the presence of signal interference, the operations comprising:

identifying messages pending transmission to at least one remote Bluetooth device;

receiving designation of frequencies to be used in transmitting the pending messages to the remote Bluetooth device according to a predetermined frequency hopping scheme;

applying the mapping rules to conditions including at least the measured signal interference characteristics for the designated frequencies to select Bluetooth packet types for use in transmitting the identified messages to the remote Bluetooth device.

29. A Bluetooth device, comprising:

a transmitter;

a receiver;

a link metric record;

a packet/power selector mapping rules dictating different Bluetooth packet types to be used for transmission under various specified conditions including prescribed signal interference characteristics a link evaluator configured to, whenever the Bluetooth device receives prescribed types of signals from other Bluetooth devices in corresponding frequency bins, assess signal interference characteristics of the received signals and store the assessed signal interference characteristics in a record in association with the corresponding frequency bin;

a processor configured to perform the following operations for each subject message pending transmission from the Bluetooth device to at least one remote Bluetooth device:

receiving designation of a frequency bin to be used in transmitting the subject message to the remote Bluetooth device according to a predetermined frequency hopping scheme;

applying the mapping rules to conditions including at least the assessed signal interference characteristics for the designated frequency bin to determine a Bluetooth packet type for use in transmitting the subject message to the remote Bluetooth device.

30. A Bluetooth device, comprising:

means for transmitting signals;

means for receiving signals;

means for storing link metric data;

packet/power selector mapping means for providing mapping rules dictating different Bluetooth packet types to be used for transmission under various specified conditions including prescribed signal interference characteristics;

link evaluator means for measuring signal interference characteristics upon different Bluetooth frequencies;

processing means for optimizing Bluetooth transmissions in the presence of signal interference by:

identifying messages pending transmission to at least one remote Bluetooth device;

receiving designation of frequencies to be used in transmitting the pending messages to the remote Bluetooth device according to a predetermined frequency hopping scheme;

applying the mapping rules to conditions including at least the measured signal interference characteristics for the designated frequencies to select Bluetooth packet types for use in transmitting the identified messages to the remote Bluetooth device.

31. A Bluetooth device, comprising:

means for transmitting signals;

means for receiving signals;

means for storing link metric data;

packet/power selector mapping means for providing mapping rules dictating different Bluetooth packet types to be used for transmission under various specified conditions including prescribed signal interference characteristics link evaluator means for, whenever the Bluetooth device receives prescribed types of signals from other Bluetooth devices in corresponding frequency bins, assessing signal interference characteristics of the received signals and storing the assessed signal interference characteristics in a record in association with the corresponding frequency bin;

processor means for performing the following operations for each subject message pending transmission from the Bluetooth device to at least one remote Bluetooth device:

receiving designation of a frequency bin to be used in transmitting the subject message to the remote Bluetooth device according to a predetermined frequency hopping scheme;

applying the mapping rules to conditions including at least the assessed signal interference characteristics for the designated frequency bin to determine a Bluetooth packet type for use in transmitting the subject message to the remote Bluetooth device.

* * * * *